United States Patent
Olson et al.

(10) Patent No.: US 7,129,460 B1
(45) Date of Patent: Oct. 31, 2006

(54) ELECTRONIC IMAGING APPARATUS WITH HIGH RESOLUTION AND WIDE FIELD OF VIEW AND METHOD

(76) Inventors: Gaylord G. Olson, 273 Jefferson Rd., Princeton, NJ (US) 08540; Michael A. Carr, 15 Lenape La., Skillman, NJ (US) 08558

( * ) Notice: Subject to any disclaimer, the term of this patent is extended or adjusted under 35 U.S.C. 154(b) by 0 days.

(21) Appl. No.: 11/162,247

(22) Filed: Sep. 2, 2005

(51) Int. Cl.
*H01L 27/00* (2006.01)
*H01J 3/14* (2006.01)
*G02B 26/08* (2006.01)
*G02B 7/182* (2006.01)

(52) U.S. Cl. .................. 250/208.1; 250/234; 250/235; 359/201; 359/202; 359/872; 359/874

(58) Field of Classification Search ............. 250/208.1, 250/234, 235; 359/196, 201, 202, 872, 874
See application file for complete search history.

(56) References Cited

U.S. PATENT DOCUMENTS

| | | | |
|---|---|---|---|
| 3,717,772 A | 2/1973 | Engman | |
| 4,004,086 A | 1/1977 | Buss | |
| 5,117,256 A * | 5/1992 | Haibara | 355/77 |
| 5,227,896 A | 7/1993 | Ozawa et al. | |
| 5,686,731 A * | 11/1997 | Wiles et al. | 250/559.22 |
| 5,686,960 A | 11/1997 | Sussman et al. | |
| 5,909,302 A * | 6/1999 | Guissin et al. | 359/225 |
| 5,986,810 A * | 11/1999 | Webb | 359/618 |
| 6,005,682 A | 12/1999 | Wu et al. | |
| 6,512,539 B1 | 1/2003 | Dance et al. | |
| 6,611,292 B1 * | 8/2003 | Tsai et al. | 348/345 |
| 6,630,952 B1 | 10/2003 | Beale | |
| 6,738,073 B1 | 5/2004 | Park et al. | |
| 6,762,861 B1 * | 7/2004 | Lan | 358/475 |

* cited by examiner

*Primary Examiner*—Thanh X. Luu
*Assistant Examiner*—Stephen Yam
(74) *Attorney, Agent, or Firm*—Ancel W. Lewis, Jr.

(57) ABSTRACT

Electronic imaging apparatus includes a main mirror that rotates about two transverse axes to reflect light for an array of subimages through a lens to a correcting mirror that reflects the light to an image detector. The correcting mirror moves in translation and tilts to correct for loss of focus of the subimages. A method of generating high resolution images includes acquiring an array of subimages by moving the main mirror and correcting each subimage with the correcting mirror. A method of surveillance includes acquiring and storing an array of initial subimages, then acquiring new subimages, comparing the new subimages with the stored subimages, and storing changed subimages.

15 Claims, 5 Drawing Sheets

ELECTRONIC IMAGING APPARATUS WITH HIGH RESOLUTION AND WIDE FIELD OF VIEW AND METHOD

TECHNICAL FIELD

The present invention relates to electronic imaging and more particularly to an electronic imaging apparatus with a wide field of view that captures a plurality of subimages to generate high resolution images.

BACKGROUND ART

The resolution of a single image captured or acquired by an image capture device, such as a film or digital camera, is finite and therefore limited. Generally the resolution of an electronic imaging device is a tradeoff between the number of picture elements (pixels) and cost. Prior known devices scan an object, by acquiring a plurality of subimages of the object, to generate a high resolution image.

One known type of electronic imaging device, known as a document scanner, is suitable for acquiring images of flat, two dimensional objects of a limited size. In a document scanner, the object and the image detector are positioned a very small, fixed distance relative to each other, and the object or the image detector moves. Examples of document scanners are flatbed scanners, sheet fed scanners, handheld scanners, fax machines and copiers. Each of these scanners is limited to scanning two dimensional objects such as sheets of paper. Handheld scanners are difficult to use. Flatbed and sheet fed scanners can only scan up to a selected maximum size, generally the size of legal or letter size paper.

Other scanners, sometimes known as "over the desk" scanners, are spaced relative to the object, and can acquire images of three dimensional objects and images of larger objects than most document scanners. Although some scanners of this type move the image detector or the object, preferably the image detector and object remain stationary during image acquisition. U.S. Pat. No. 5,686,960 to Sussman et al. discloses a scanner having a stationary image detector spaced above the object and a rotating disk with a preselected number of deflectors that deflect tiles or subimages of the object through a lens onto the image detector. Sussman et al. also discloses a scanner having a stationary image detector spaced above the object and a pair of selectively rotatable mirrors that reflect tiles or sub-images of the object through a lens onto the image detector. The image path from the object to the reflector or mirror in Sussman et al. is oblique rather than perpendicular to the object for all but at most one tile or subimage.

Generally for "over the desk" scanners with a stationary object and image detector, the image path from the object to the image detector is oblique or slanted. Such an oblique image path can distort and defocus the subimage acquired. U.S. Pat. No. 6,512,539 to Dance et al. discloses a scanner having a stationary image detector spaced above the object and an inner rotating mirror that receives light from four outer mirrors. Each outer mirror is centered over a quadrant of the object so that the image paths are perpendicular to the object. The scanner disclosed by Dance et al. requires an outer mirror for each subimage.

Prior known security or surveillance systems generally have stationary cameras or motor driven cameras that tilt, pan and zoom. Stationary cameras have a limited field of view and generally have limited resolution. Motor driven cameras generally sweep the area of interest over a period of multiple seconds, such that portions of the area of interest are missed by the camera for multiple seconds.

Some prior known systems for taking panoramic pictures use convex mirror systems with a camera to acquire the entire panorama in a single shot. These systems provide relatively low resolution pictures. Other systems for taking panoramic pictures rotate the camera about a center point.

DISCLOSURE OF THE INVENTION

Electronic imaging apparatus includes a main mirror assembly, a lens, a correcting mirror and an image detector. Light reflected by a region of an object is reflected by the main mirror assembly through the lens to the correcting mirror, and therefrom onto the image detector to acquire a subimage of the object. The main mirror assembly has a mirror that rotates about relatively orthogonal first and second axes to acquire an overlapping array of subimages. The correcting mirror is movable in translation and tilt, and corrects for focal variations for the overlapping array of subimages such that a high resolution image of the object is captured and generated without moving the object or the image detector. Electronic imaging apparatus for surveillance and panoramic photography includes a main mirror assembly, a lens and an image detector. The main mirror assembly rotates a mirror about a vertical axis and about a horizontal axis to reflect light for an array of subimages through the lens onto the image detector to acquire the array of subimages.

A method of generating high resolution images includes the steps of providing the electronic imaging apparatus, acquiring an array of subimages, and electronically merging or stitching the subimages together. The step of acquiring includes, for each subimage, the substeps of moving the first mirror to reflect light for the subimage through the lens to the correcting mirror, and moving the correcting mirror to reflect the light for the subimage to the image detector in focus. A method of generating a panoramic image comprises the steps of providing the electronic imaging apparatus, acquiring an array of subimages by successively acquiring a subimage, then moving the main mirror by rotating the mirror about at least one of the first or second axes, and then acquiring a next subimage, stitching the subimages together, and rotating all the subimages to an upright orientation to form a panoramic image. A method of high resolution surveillance comprises the steps of providing the electronic imaging apparatus, acquiring an array of initial subimages by successively acquiring a said subimage, then moving the main mirror, and then acquiring a next subimage, storing the initial subimages, after acquiring the array of initial subimages, acquiring an array of new subimages, then comparing each new subimage with the respective stored subimage, and if a new subimage is changed relative to the respective stored subimage, storing that new subimage.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
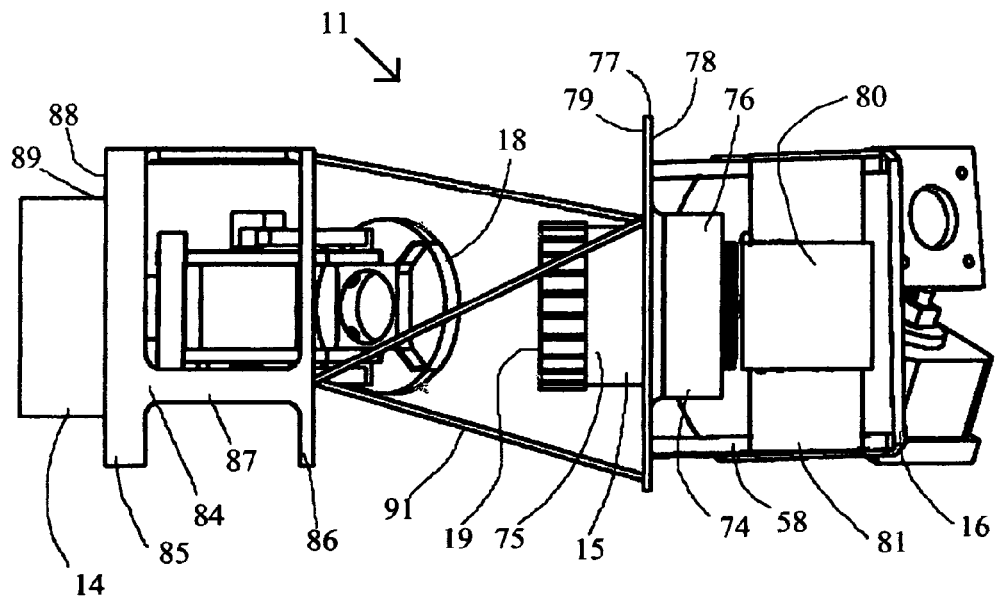
FIG. 1 is a top plan view of an electronic imaging apparatus embodying features of the present invention.
Figure 2:
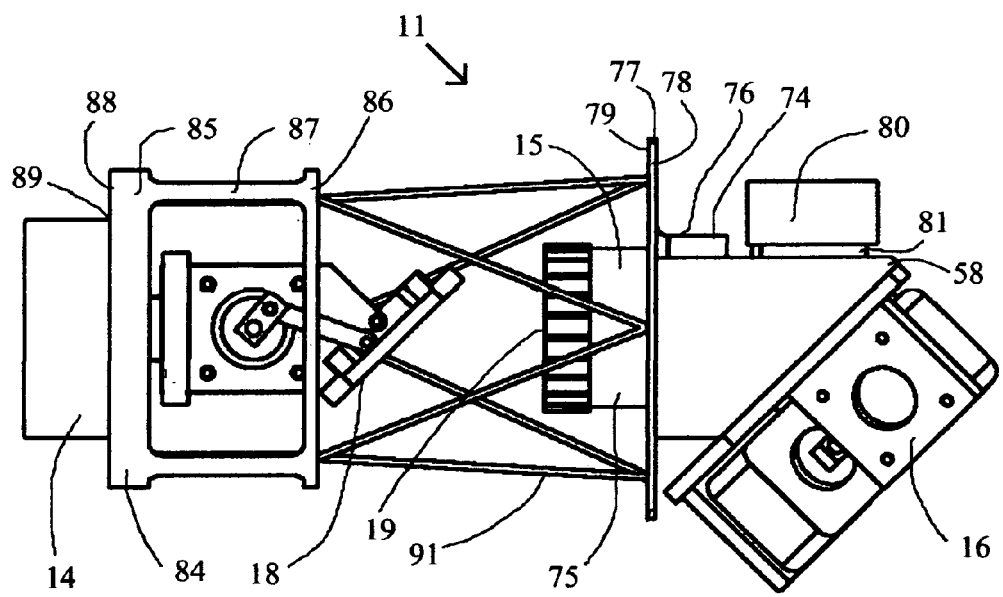
FIG. 2 is a side elevation view of the apparatus of FIG. 1.
Figure 3:
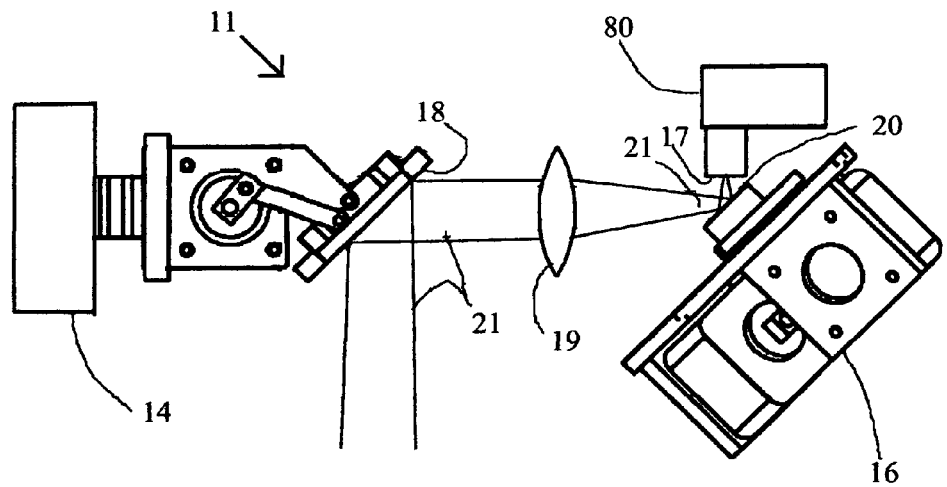
FIG. 3 is a side elevation view of the apparatus of FIG. 1 with portions removed.

Referring to FIGS. 1, 2 and 3, an electronic imaging apparatus 11 embodying features of the present invention includes a main mirror assembly 14, a lens assembly 15, a correcting mirror assembly 16 and an image detector 17. The main mirror assembly 14 includes a main mirror 18. The lens assembly 15 includes a lens 19. The correcting mirror assembly 16 includes a correcting mirror 20. The main mirror 18, lens 19, correcting mirror 20 and image detector 17 are spaced from each other and aligned with each other to define an image path 21. Light from an object or scene of interest is received at the main mirror 18. The light is reflected by the main mirror 18 through the lens 15 to the correcting mirror 20. The correcting mirror 20 reflects the light to the image detector 17.

Figure 4:
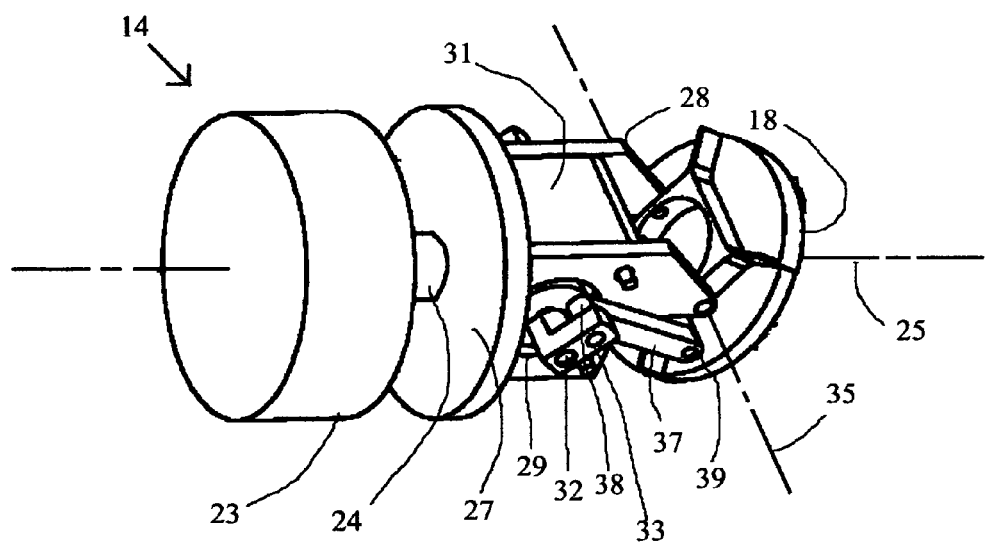
FIG. 4 is a perspective view of a main mirror assembly for the apparatus of FIG. 1.
Figure 5:
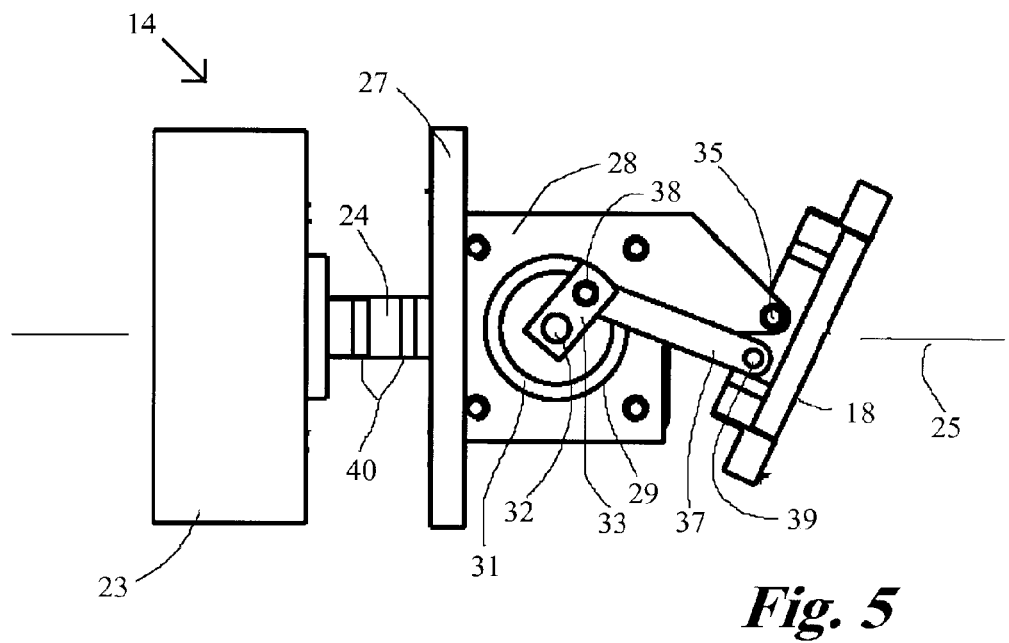
FIG. 5 is a side elevation view of a main mirror assembly for the apparatus of FIG. 1.

As shown in FIGS. 4 and 5, the main mirror assembly 14 includes an electrical first motor 23 having a first shaft 24 that rotates about a first axis 25. The first motor 23 is a stepper motor or other precisely controllable motor. The term motor as used herein includes any device, electrical or non-electrical, for imparting rotary motion, including, by way of example, and not as a limitation, rotary actuators and galvanometer type drive units. A substantially flat base 27 mounts on the shaft 24 perpendicular to the first axis 25. Two spaced, parallel side plates 28 attach to the base 27 and extend therefrom away from the first motor 23. Aligned motor shaft apertures 29 extend through the side plates 28.

An electrical second motor 31 mounts between the side plates 28 near the base 27. The second motor 31 is a stepper motor or other precisely controllable motor. The second motor 31 has a second shaft 32 perpendicular to the first axis 25 that extends through the motor shaft apertures 29 on opposite sides of the second motor 31. A transversely extending arm 33 attaches to each end of the second shaft 32, outside the side plates 28. The main mirror 18 rotably attaches to the side plates 28 along a second axis 35 that is perpendicular to the first axis 25 and parallel to the second shaft 32. The first motor 23 preferably is rotatable continually around the first axis 25 while the second motor 31 only needs to rotate through a limited arc or angle.

A pair of elongated links 37 each have a first end 38 and a spaced second end 39. The first end 38 of each link 37 is spaced from the second shaft 32 and pivotally connected to an arm 33. The second end 39 of each link is spaced from the second axis 35 and pivotally connected to the main mirror 18 so that rotation of the second shaft 32 by the second motor 31 rotates the main mirror 18 about the second axis 35. The arms 33 shown are positioned to extend from the second shaft 32 in the opposite direction as the second end 39 of each link 37 is spaced from the second axis 35, so that rotation of the second shaft 32 in a clockwise direction rotates the main mirror 18 counterclockwise. A pair of spaced sliprings 40 encircle the first shaft 24 and electrically connect to the second motor 31. Additional sliprings 40 may be required, depending on the second motor 31 that is used.

The main mirror assembly 14 shown has a main mirror 18 that is rotatable about the first and second axes 25 and 35 for acquisition of a two dimensional array of images. Alternatively, the main mirror assembly 14 can have a single mirror rotatable about a single axis for acquisition of a one dimensional array of images, or two separate mirrors, each rotatable about a different axis, for acquisition of a two dimensional array of images.

Figure 6:
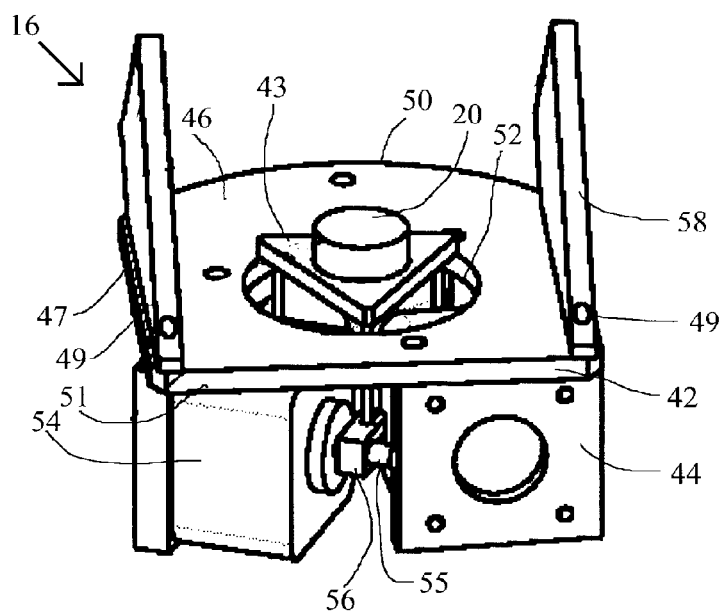
FIG. 6 is a perspective view of a correcting mirror assembly for the apparatus of FIG. 1.
Figure 7:
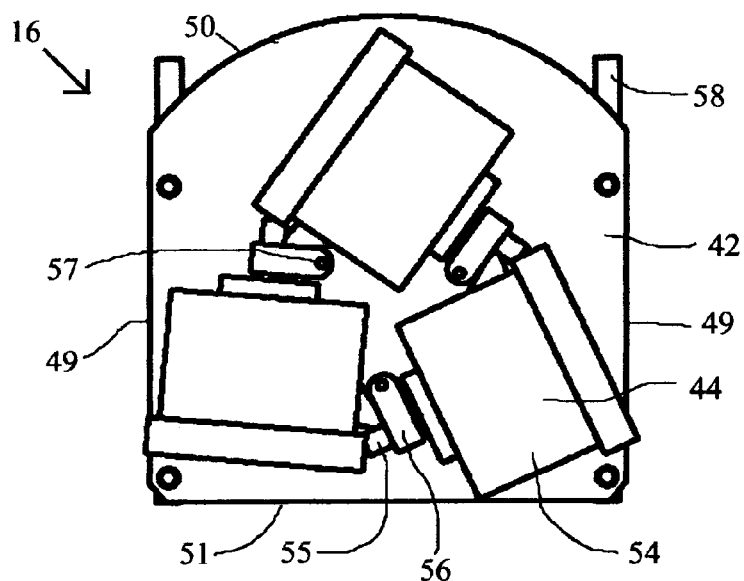
FIG. 7 is a bottom plan view of the correcting mirror assembly of FIG. 6.
Figure 8:
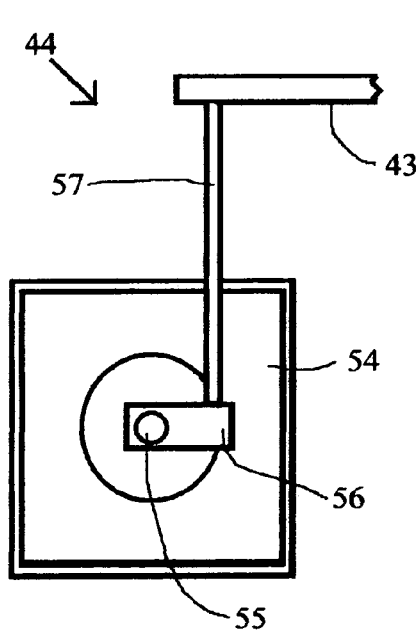
FIG. 8 is a partial elevation side view of the correcting mirror assembly of FIG. 6.

Referring to FIGS. 6, 7 and 8, the correcting mirror assembly 16 includes a base 42, a correcting mirror plate 43 with the correcting mirror 20 mounted thereon, and three actuators 44 that mount on the base 42 and move the correcting mirror plate 43 as described hereinafter. The base 42 is a flat plate with a first face 46 and a spaced, oppositely facing second face 47. The base 42 shown has a pair of spaced, parallel, straight side edges 49 connected at the top by a convex, curved upper edge 50 and at the bottom by a straight lower edge 51. A circular aperture 52 extends through the base 42 from the first face 46 to the second face 47. The correcting mirror plate 43 shown is an equilateral triangle.

The actuators 44 each include a motor 54 with a driveshaft 55, an arm 56 attached and extending transverse to the driveshaft 55, and a rod 57 that rigidly attaches to the arm 56 opposite the driveshaft 55 and extends transverse to the arm 56 and to the driveshaft 55. The motors 54 are stepper motors or other precisely controllable motors. The motors 54 are mounted at 120 degrees relative to each other on the second face 47 of the base 42 with the driveshafts 55 pointing generally outwards, the arms 56 pointing generally inwards, and the rods 57 extending through the aperture 52. The correcting mirror plate 43 is spaced from the first face 46 with the correcting mirror 20 facing away from the first face 46 and with each corner of the correcting mirror plate 43 attaching to a rod 57 opposite the arm 56. Rods 57 are preferably made of a resilient material such as plastic or fiberglass so that the rod 57 flexes when the respective arm 56 moves. A pair of spaced, generally triangular mounting brackets 58 are rigidly mounted on the first face 46 at the side edges 49, extending transverse to the first face 46.

Figure 9:
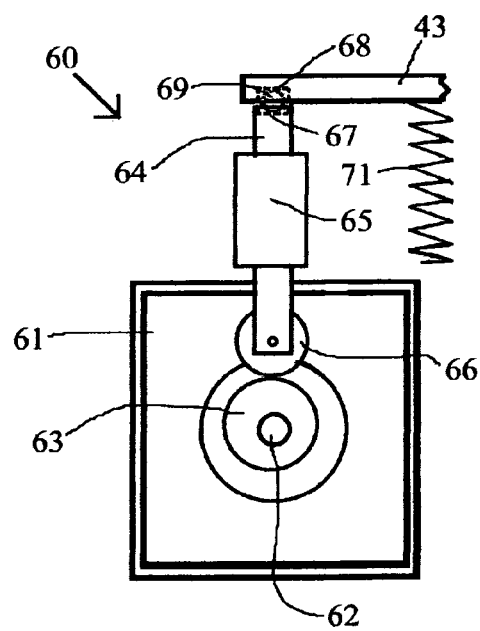
FIG. 9 is a partial elevation side view of the correcting mirror assembly of FIG. 6 with an alternative actuator.

FIG. 9 shows an alternative actuator 60 having a motor 61 with a driveshaft 62 and an eccentric cam 63 mounted on the driveshaft 62. An elongated rod 64 is slidably mounted in a sleeve bearing 65, and has a rotably mounted cam follower 66 at one end and a shallow, cylindrical, flat bottomed first cavity 67 at the opposite end. Each corner of the correcting mirror plate 43 has a shallow, cylindrical, flat topped second cavity 68 of the same size as the first cavity 67. A precision steel ball 69 is sized to fit into the first and second cavities 67 and 68 and to allow a selected lateral or radial movement between the rod 64 and the correcting mirror plate 43. The cam follower 66 is positioned on the cam 63. A means for biasing 71, such as a spring or other tension member, biases the correcting mirror plate 43 toward the base 42. Other actuators, such as linear actuators can also be used.

Referring again to FIGS. 1, 2 and 3, the lens assembly 15 includes a base 74, a lens barrel 75 and the lens 19. The lens barrel 75 is sized and shaped to hold the lens 19. The lens 19 can be a single lens or a compound lens. The base 74 includes a cylindrical portion 76, sized to receive the lens barrel 75, and a radially outwardly extending, circular flange 77 attached to an end of the cylindrical portion 76. The flange 77 has a first side 78, on which the cylindrical portion 76 is attached, and a spaced oppositely facing second side 79. The mounting brackets 58 rigidly attach to the first side 78 of the flange 77, opposite the base 42 of the correcting mirror assembly 16, to mount the correcting mirror assembly 16 to the lens assembly 15 with the correcting mirror 20 at an angle relative to the lens 19.

An image detector assembly 80 includes the image detector 17 and associated electronics. An image detector bracket 81 extends between the third edges of the mounting brackets 58 opposite the base 42 of the correcting mirror assembly 16 and the first side 78 of the flange 77. The image detector assembly 80 mounts on and extends through the image detector bracket 81, with the image detector 17 facing the correcting mirror 20. The normal to the base 42 of the correcting mirror assembly 16 is aligned at an angle that is the bisector of the angle between the axis of the lens 19 and a line normal to the image detector 17. The image detector 17 can be a CCD array, a CMOS array or other electronic image detection device.

A motor housing 84 includes spaced, cylindrical first and second bands 85 and 86 connected by three circumferentially spaced bars 87. A flange 88 extends inwardly from the first band 85, opposite bars 87 to form an aperture 89. The aperture 89 is sized to receive the first motor 23 of the main mirror assembly 14. The first motor 23 mounts in the aperture 89 of the motor housing 84 with the bars 87 extending away from the first motor 23. Six elongated rods 91 extend in a zigzag pattern from the second band 86 of the motor housing 84 to the second side 79 of the flange 77 of the base 74 of the lens assembly 15 to rigidly hold the main mirror assembly 14 relative to the lens assembly 15, the correcting mirror assembly 16 and the image detector assembly 80.

The electronic imaging apparatus 11 is generally securely mounted for acquisition of images. Images are generated by acquisition of an array of subimages which are stitched or blended together with computer software. The subimages can overlap by as much as 10%. For scanning applications such as acquisition of an image of a flat object such as a document, the electronic imaging apparatus 11 is spaced from the object. The main mirror 18 is rotated about the first and second axes 25 and 35 to a selected position for acquisition of each subimage. The array of subimages is acquired by sequentially moving the main mirror 18 and then acquiring a subimage.

Figure 10:
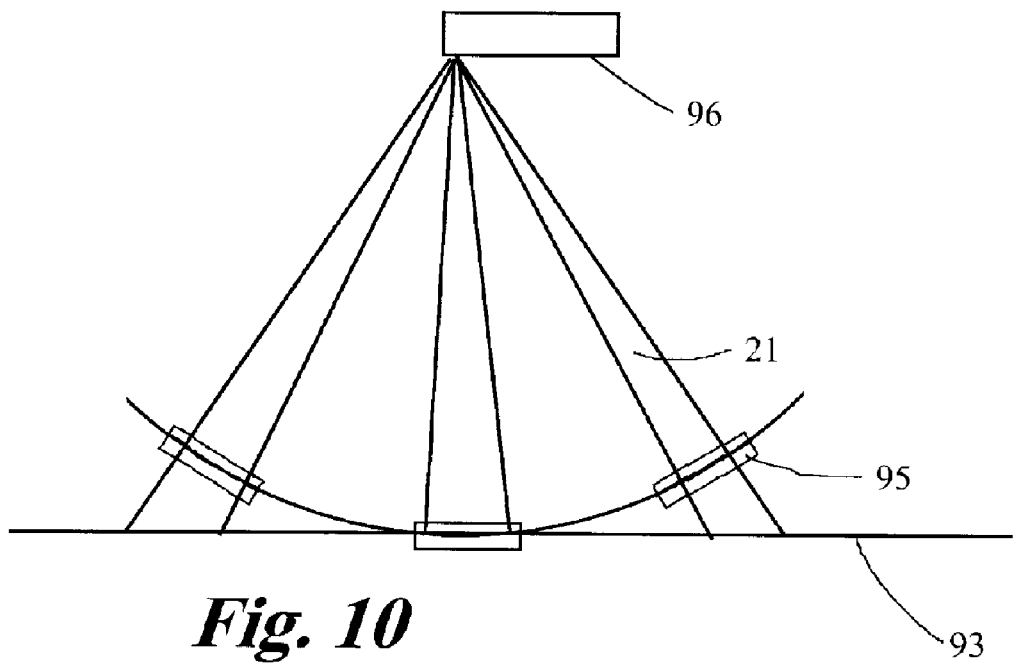
FIG. 10 is a side schematic view of image paths to an apparatus similar to the apparatus of FIG. 1, without a correcting mirror.
Figure 11:
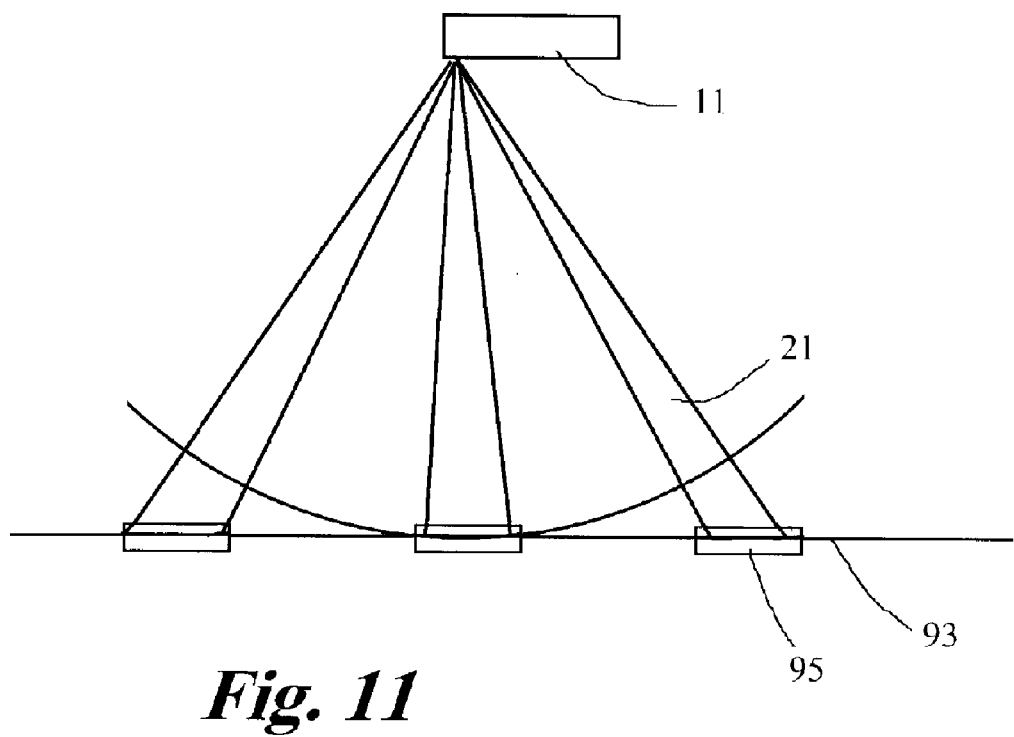
FIG. 11 is a side schematic view of image paths to the apparatus of FIG. 1, with a correcting mirror.

FIGS. 10 and 11 show the electronic imaging apparatus positioned for acquiring the image of a two dimensional object 93. For each subimage there is an image path 21 from the object 93 to the electronic imaging apparatus. Each image path 21 has a best focus region 95. FIG. 10 shows an electronic imaging apparatus 96, similar to the electronic imaging apparatus 11 described herein, but without a correcting mirror 20. The correcting mirror 20 could be replaced with a stationary mirror or the image detector 17 could be repositioned to be aligned with the lens 19. In FIG. 10 the object 93 is within the best focus region 95 only for the image path 21 that is normal to the object 93. The object 93 is rotated and beyond the best focus region 95 for all other image paths 21.

Moving all three of the actuators 44 of the correcting mirror assembly 16 equally moves the correcting mirror 20 linearly or in translation in a direction orthogonal to the base 42 of the correcting mirror assembly 16. This direction is intermediate the image path 21 from the lens 19 to the correcting mirror 20 and the image path 21 from the correcting mirror 20 to the image detector 17. Moving the correcting mirror 20 in translation in this direction shortens or lengthens the image path 21 from the lens 19 to the image detector 17, and thereby the distance of the best focus region 95 from the lens 19. Moving the actuators 44 individually or by different amounts tilts the correcting mirror 20 relative to the direction of translation. Tilting the correcting mirror 20 has an effect equivalent to tilting the image detector 17 relative to the lens 19. Tilting the correcting mirror 20 rotates the best focus region 95 relative to the image path 21 from the object 93 to the electronic imaging apparatus 11. As shown in FIG. 11, by translating and tilting the correcting mirror 20, the best focus region 95 is moved and rotated such that the object 93 is in the best focus region 95 for all subimages. As the array of subimages is acquired by sequentially moving the main mirror 18 to a selected position for each subimage, the correcting mirror 20 is selectively moved for each subimage such that the portion of the object 93 associated with that subimage is entirely within the best focus region 95.

The electronic imaging apparatus 11 can be rotated 90 degrees from the position shown in FIG. 1, with the main mirror assembly 14 preferably towards the top, for panoramic photography and surveillance. For panoramic photography and surveillance the correcting mirror 20 is not required except where focus adjustment for close objects is needed. The main mirror assembly 14 moves the main mirror 18 rapidly and with precision. The moment of inertia of the parts that move around the first axis 25 of the main mirror assembly 14 is low due to the mounting of the second motor 31 along the first axis. The low moment of inertia allows the main mirror 18 to move rapidly between positions of subimage capture. The main mirror assembly 14 moves the main mirror 18 without gears. Gears have backlash that causes imprecision. The counter-rotation of the main mirror 18 around the second axis 35 relative to the second motor 31 minimizes the induced torque. The sliprings 40 allow the first shaft 24 of the first motor 23 to rotate in either direction continually around the first axis 25 while providing electrical power to the second motor 31.

When the electronic imaging apparatus 11 is used for panoramic photography and surveillance, the first axis 25 is substantially vertical. As the main mirror 18 rotates around the first axis 25, the subimages are rotated away from an upright or vertical orientation relative to the image detector. A method of generating a panoramic image includes the steps of providing an electronic imaging apparatus 11, with or without a correcting mirror, sequentially acquiring an array of subimages, stitching the subimages together and then rotating each subimage to an upright orientation.

A method of high resolution surveillance includes the steps of providing an electronic imaging apparatus 11, with or without a correcting mirror, sequentially acquiring an array of initial subimages, storing the initial subimages as stored subimages, then acquiring an array of new subimages, comparing each new subimage to the respective stored subimage, and if the new subimage is changed relative to the stored subimage, storing that new subimage. The initial subimages are acquired at high resolution while new subimages can be acquired at a lower resolution, by binning or other processes, for higher speed. If a new subimage is changed relative to the last respective stored subimage, a high resolution subimage can be acquired and stored.

The steps of storing the initial subimages, comparing, and storing the new subimage, described above, may be done at a central computer that is connected to the electronic imaging apparatus 11 by a communications path that might be electrical, fiber optic, or wireless. Alternatively, the image detector assembly 80 of the electronic imaging apparatus 11 can also include memory and processing capabilities. In this case the image detector assembly 80 could store the last stored subimage for each subimage location in the array. The step of comparing each new subimage to the respective stored subimage could thus be performed by the image detector assembly 80. After transmission to a central computer of the array of initial subimages from the electronic imaging apparatus 11, only changed subimages or portions thereof need to be subsequently transmitted. By providing the image detector assembly 80 with memory and processing capabilities, the amount of data transmitted from the electronic imaging apparatus 11 is minimized. Additional reduction of this data can be realized by use of conventional image or video compression methods in the image detector assembly 80 prior to transmission.

The area of surveillance or any selected region within the area can be displayed. Regions can be selected by an operator or can be automatically selected when motion or change is detected. The subimages of the area or the selected region are rotated to an upright orientation and stitched together into an image for display.

The electronic imaging apparatus 11 can be used in conjunction with a prior known pan and tilt camera or pan, tilt and zoom camera, with a fixed or zoom long focal length lens, respectively. Such a camera could be used, in combination with the electronic imaging apparatus 11, to acquire a small field of view, very high resolution image or video of a specific selected region. This might also be done with a second electronic imaging apparatus 11 with a longer focal length or zoom lens.

Although the present invention has been described with a certain degree of particularity, it is understood that the present disclosure has been made by way of example and that changes in details of structure may be made without departing from the spirit thereof.

What is claimed is:

1. Electronic imaging apparatus for acquiring an array of subimages to generate a high resolution image, comprising:
   a main mirror assembly having at least a main mirror rotatable about a first axis, said main mirror assembly receiving light for said subimages and reflecting said light along an image path,
   a lens spaced from said main mirror assembly along said image path, said lens receiving said light from said main mirror assembly and focusing said light,
   a correcting mirror spaced from said lens along said image path, said correcting mirror receiving said light from said lens and reflecting said light along said image path, said correcting mirror being movable for focal correction of said subimages, and
   an image detector spaced from said correcting mirror along said image path and receiving said light from said correcting mirror to form said subimages,
   whereby said image detector receives each said subimage in focus.

2. The apparatus as set forth in claim 1 wherein said main mirror is rotatable about a second axis that is transverse to said first axis,
   whereby a two dimensional array of subimages can be acquired for generation of said high resolution image by rotation of said first mirror about said first and second axes.

3. The apparatus as set forth in claim 1 wherein said correcting mirror is movable in translation in a direction orthogonal to said correcting mirror to lengthen and shorten said image path from said lens to said image detector.

4. The apparatus as set forth in claim 1 wherein said correcting mirror is movable in translation in a direction intermediate said image path from said lens to said correcting mirror, and said image path from said correcting mirror to said image detector.

5. The apparatus as set forth in claim 4 wherein said correcting mirror is tiltable along any orientation relative to said direction.

6. The apparatus as set forth in claim 1 including a correcting mirror assembly for moving said correcting mirror, said correcting mirror assembly having a base and at least three actuators on said base, said actuators engaging said correcting mirror in a two dimensional pattern such that said actuators can move said correcting mirror in translation and can tilt said correcting mirror.

7. The apparatus as set forth in claim 6 wherein each said actuator includes a motor attached to said base and a rod having a first end and a spaced second end opposite said first end, said first end being coupled to and movable by said motor, said motors being arranged in a triangle on said base and said rods extending substantially perpendicular to said base with said second end engaging said correcting mirror.

8. The apparatus as set forth in claim 7 wherein:
   each said motor includes a rotary driveshaft and an eccentric cam on said driveshaft that engages said first end of said rod to move said rod a variable distance from said base as said driveshaft rotates, and
   said correcting mirror assembly includes means, connected to said correcting mirror, for biasing said correcting mirror towards said base.

9. The apparatus as set forth in claim 7 wherein:
   said motor for each said actuator includes a rotary driveshaft and an arm attached to said driveshaft,
   said rod for each said actuator is made of a resilient material, said first end is spaced from said driveshaft and attached to said arm, and said second end is attached to said correcting mirror.

10. Electronic imaging apparatus for acquiring an array of subimages to generate a high resolution image, comprising:
    a main mirror assembly having a main mirror rotatable about a first axis and a second axis that is transverse to said first axis, said main mirror assembly receiving light for said subimages and reflecting said light along an image path,
    a lens spaced from said main mirror assembly along said image path, said lens receiving said light from said main mirror assembly and focusing said light,
    a correcting mirror spaced from said lens along said image path, said correcting mirror receiving said light from said lens and reflecting said light along said image path, said correcting mirror being movable for focal correction of said subimages,
    a correcting mirror assembly for moving said correcting mirror in translation and tilting said correcting mirror, said correcting mirror assembly having a base and three actuators, each said actuator including a motor attached to said base with said motors being arranged in an equilateral triangle, each said motor having a rotary driveshaft and an arm attached to said driveshaft, each said actuator including a rod made of a resilient material and having a first end and a spaced second end opposite said first end, said rod extending substantially perpendicular to said base with said first end spaced from said driveshaft and attached to said arm, and said second end attached to said correcting mirror, and an image detector spaced from said correcting mirror along said image path and receiving said light from said correcting mirror to form said subimages, whereby said image detector receives each said subimage in focus.

11. Electronic imaging apparatus for acquiring arrays of subimages to generate high resolution panoramic and surveillance images, comprising:

a main mirror assembly having a first motor with a first shaft that rotates about a first axis, a base mounted on said first shaft and rotating therewith, a spaced pair of legs extending transverse said base, a main mirror rotably mounted to said legs about a second axis transverse to said first axis, a second motor mounted between said legs between said base and said main mirror, and at least two sliprings on said first shaft, said second motor being coupled to said main mirror to rotate said main mirror about said second axis, said second motor being electrically connected to said sliprings to power said second motor, said main mirror receiving light for said subimages and reflecting said light along an image path, a lens spaced from said main mirror assembly along said first axis, said lens receiving said light from said main mirror and focusing said light, and an image detector spaced from said lens along said first axis and receiving said light from said lens to form said subimages, whereby said main mirror rotates with minimal inertia about said first axis, said main mirror can continually rotate about said first axis, and said main mirror is rapidly and precisely positioned to acquire each said subimage.

12. The apparatus as set forth in claim 11 wherein said second motor includes a second shaft that is parallel to said second axis, an arm that extends transverse to said second shaft and is transverse said first axis, and a link having spaced first and second ends, said first end being spaced from said second shaft and pivotally attached to said arm, and said second end being spaced from second axis and pivotally attached to said main mirror.

13. The apparatus as set forth in claim 12 wherein said first end of said link is spaced from said second shaft in an opposite direction as said second end is spaced from said second axis, whereby rotation of said second motor in one direction rotates said main mirror about said second axis in an opposite direction.

14. The apparatus as set forth in claim 11 including a correcting mirror along said image path between said lens and said image detector, said correcting mirror receiving said light from said lens and reflecting said light to said image detector, said correcting mirror being movable in translation and tilt to correct focus of said subimages.

15. A method of generating a high resolution image comprising the steps of:

providing an electronic imaging apparatus including a first mirror rotatable about at least a first axis, a lens spaced from said main mirror assembly along a selected image path, a correcting mirror spaced from said lens along said image path and movable in translation and tilt, and an image detector spaced from said correcting mirror along said image path, acquiring an array of subimages including, for each subimage, the substeps of:

moving said first mirror to reflect light for said subimage through said lens to said correcting mirror, and moving said correcting mirror to reflect said light to said image detector to form said subimage in focus, and electronically stitching said subimages together to form said high resolution image.

* * * * *